US005747074A

United States Patent [19]

Ollendick et al.

[11] Patent Number: 5,747,074

[45] Date of Patent: May 5, 1998

[54] APPARATUS FOR THE MANUFACTURING OF PRESTRESSED REINFORCED CONCRETE RAILROAD TIES AND THE LIKE

[76] Inventors: David P. Ollendick, 335 Rio Grande Pl., San Ramon, Calif. 94583; Robert W. Ollendick, P.O. Box 2567, Wickenburg, Ariz. 85358

[21] Appl. No.: 383,727

[22] Filed: Feb. 2, 1995

[51] Int. Cl.[6] .................................................. B23B 19/00

[52] U.S. Cl. ........................ 425/111; 425/123; 425/169; 248/86

[58] Field of Search ................................ 425/111, 123, 425/169; 249/86

[56] References Cited

U.S. PATENT DOCUMENTS

| | | | |
|---|---|---|---|
| 3,182,948 | 5/1965 | Lawrence | 249/189 |
| 3,207,829 | 9/1965 | Neiber, Jr. | 264/228 |
| 3,491,417 | 1/1970 | Haller et al. | 25/41 |
| 3,577,612 | 5/1971 | Hidden | 25/118 |
| 3,577,613 | 5/1971 | Hidden et al. | 25/118 |
| 3,608,163 | 9/1971 | Harford | 25/120 |
| 3,666,385 | 5/1972 | Baker | 425/111 |
| 3,685,934 | 8/1972 | Huber et al. | 425/111 |
| 3,999,913 | 12/1976 | Branitzky | 425/111 |
| 4,051,216 | 9/1977 | Bratchell | 264/157 |
| 4,149,306 | 4/1979 | Tice | 29/452 |
| 4,773,840 | 9/1988 | Jantzen | 425/436 |

FOREIGN PATENT DOCUMENTS

| | | | |
|---|---|---|---|
| 3543369 | 12/1985 | Germany | B28B 23/18 |
| 238960 | 12/1945 | Switzerland . | |

*Primary Examiner*—Thomas R. Weber

*Attorney, Agent, or Firm*—Schapp and Hatch

[57] ABSTRACT

Apparatus for the manufacturing of prestressed reinforced concrete railroad ties and the like in which the apparatus consists of an elongated spine or compression member which has no foundation but rather is independent of the supporting surface upon which it rests. In one version of the apparatus two bridge members confront the opposite ends of the spine and permanent tension resisting members pass beneath the spine from end to end of the spine and are attached to the lower ends of the bridge members. In another version two structural members are embedded in the concrete of the spine and protrude to provide terminal members.

5 Claims, 8 Drawing Sheets

APPARATUS FOR THE MANUFACTURING OF PRESTRESSED REINFORCED CONCRETE RAILROAD TIES AND THE LIKE

BACKGROUND OF THE INVENTION

1. Field of the Invention

The present invention relates to prestressed reinforced concrete railroad ties and the like, and more particularly to methods and apparatus for the manufacturing of prestressed reinforced concrete railroad ties and the like.

2. Description of the Prior Art

Methods and apparatus for the manufacturing of prestressed reinforced concrete railroad ties and the like are known in the prior art.

For example, methods and apparatus for the manufacturing of prestressed reinforced concrete railroad ties are disclosed in U.S. Pat. No. 4,773,840, issued to Steven L. Jantzen on Sep. 27, 1988, and entitled MANUFACTURE OF PRE-STRESSED CONCRETE RAILROAD TIES.

Process and equipment for manufacturing pre-cast elements, made of prestressed concrete, with immediate tensioning, in particular prestressed concrete sleepers are disclosed in Patent Cooperation Treaty Document PCT/EP93/00289.

A method of molding concrete ties or other similar articles having prestressed reinforcing wires or rods therein is disclosed in U.S. Pat. No. 4,051,216, issued to Robert Lyndon Bratchell on Sep. 27, 1977, and entitled IN-LINE MOLDING OF PRESTRESSED CONCRETE ARTICLES.

A portable molding apparatus for prestressed concrete members, such as concrete railroad ties, is disclosed in U.S. Pat. No. 3,577,613, issued to William P. Hidden on May 4, 1971, and entitled PORTABLE MOLDING APPARATUS.

An apparatus for forming prestressed concrete products is disclosed in U.S. Pat. No. 3,666,385, issued to Robert S. Baker on May 30, 1972, and entitled APPARATUS FOR MAKING PRESTRESSED CONCRETE MEMBERS.

A PORTABLE TENSIONING SYSTEM FOR PRODUCING PRE-STRESSED CONCRETE BEAMS is disclosed in U.S. Pat. No. 4,149,306, issued to Ralph J. Tice on Apr. 17, 1979.

APPARATUS FOR PRODUCTION OF REINFORCED CONCRETE PRECAST UNITS is disclosed in U.S. Pat. No. 3,491,417, issued to Hans Haller and Erwin Wendl on Jan. 27, 1970.

APPARATUS FOR PRODUCTION OF PRESTRESSED MOLDED CONCRETE MEMBERS is disclosed in U.S. Pat. No. 3,608,163, issued to Jon W. Harford on Sep. 28, 1971.

Characteristically, some of the above-identified patents and other documents disclose large, complex and extremely expensive equipment, some of which equipment is completely lacking in portability, requires special foundations, or must be located in a specially provided building of large area.

It is believed that the documents listed immediately below contain information which is or might be considered to be material to the examination hereof.

U.S. Pat. No. 3,207,829

U.S. Pat. No. 3,182,948

U.S. Pat. No. 3,999,913

U.S. Pat. No. 3,685,934

British Patent Specification No. 1,357,836

British Patent Specification No. 1,460,149

German Laying Open Document No. 35 43 369

German Patent Publication 1 024 003

Swiss Patent 238960

It is to be understood that the term "prior art" as used herein or in any statement made by or on behalf of applicants herein means only that any document or thing referred to as prior art bears, directly or inferentially, a date which is earlier than the effective filing date hereof.

No representation or admission is made that any of the above-listed documents is part of the prior art, or that no more pertinent information exists.

A copy of each of the above-listed documents except the Bratchell patent is submitted to the United States Patent and Trademark Office herewith. A copy of Bratchell will be supplied shortly.

SUMMARY OF THE INVENTION

Accordingly, it is an object of the present invention to provide apparatus for the manufacturing of prestressed reinforced concrete railroad ties and the like, which apparatus are simpler and less expensive than apparatuses of the prior art provided for the same purpose.

Another object of the present invention is to provide apparatus for the same purpose which is comprised in part of elements, sometimes called "permanent elements", which are fabricated at a manufacturing site, and left at that site, or disposed of near that site when manufacturing operations at that site are permanently or temporarily discontinued.

Yet another object of the present invention is to provide apparatus for the above-stated purpose which is comprised of elements, sometimes called "portable elements", which are moved from manufacturing site to manufacturing site, and which may be fabricated at a location or locations remote from these manufacturing sites.

A further object of the present invention is to provide apparatus for the above-stated purpose, which apparatus is aboveground apparatus, i.e., does not require a foundation.

A further object of the present invention is to provide apparatus for the above-stated purpose, which apparatus, during manufacturing, need not be contained in a permanent building, but rather may be contained in a temporary shelter such as a tent, or may in certain climates be operated out of doors.

Another object of the present invention is to provide apparatus for the above-stated purpose, which apparatus is equally adaptable to the production of one prestressed reinforced concrete railroad tie at a time or to the production of multiple prestressed reinforced concrete railroad ties at a time.

A yet further object of the present invention is to provide apparatus for the above-stated purpose, which apparatus includes means for the provision of a report corresponding to each individual product produced thereby, which report lists the tension in each reinforcing element of the product during the curing of the concrete mass of the product, or the maximum and minimum tension in each reinforcing element of the product during the curing of the concrete mass of the product.

Another object of the present invention is to provide apparatus for the above-stated purpose wherein each reinforcing element incorporated into each product is individually fully tensioned.

Yet another object of the present invention is to provide apparatus for the above-stated purpose which minimizes wastage of reinforcing element material.

A further object of the present invention is to provide apparatus for the above-stated purpose, which apparatus can readily be adapted to the production of reinforced concrete elements of many different kinds, sizes and configurations.

A yet further object of the present invention is to provide apparatus for the above-stated purpose, which apparatus can readily be adapted to manufacture in existing buildings.

Another object of the present invention is to provide novel methods for fabricating apparatuses for the manufacture of prestressed reinforced concrete railroad ties and the like.

Yet another object of the present invention is to provide novel methods for the manufacture of prestressed reinforced concrete railroad ties and the like.

A further object of the present invention is to provide methods of accomplishing the above-stated objects, which methods include the step of fully tensioning each reinforcing element in a particular product individually.

A yet further object of the present invention is to provide methods of accomplishing the above-stated objects, which methods include the steps of individually monitoring the tension in each reinforcing element during the curing of a particular product and providing a certificate setting forth the tension in each individual reinforcing element during the curing of a particular product.

Another object of the present invention is to provide methods of accomplishing the above-stated objects, which methods include the step of providing a certificate corresponding to each particular product in which is tabulated the maximum and minimum tension in each reinforcing element of that product throughout the curing of that product.

Other objects of the present invention will in part be obvious and will in part appear hereinafter.

The present invention, accordingly, comprises the several steps and the relation of one or more of such steps with respect to each of the others, and the apparatus embodying features of construction, combinations of elements, and arrangements of parts which are adapted to effect such steps, all as exemplified in the following disclosure, and the scope of the present invention will be indicated in the claims appended hereto.

In accordance with a principal feature of the present invention an apparatus for the manufacturing of prestressed reinforced concrete railroad ties is comprised of an elongated spine member which is formed substantially entirely of concrete and has no foundation.

In accordance with another principal feature of the present invention said spine member, in a preferred embodiment of the present invention, is composed of a plurality of mutually abutting modules, each of which modules is formed substantially entirely from concrete.

In accordance with yet another principal feature of the present invention said spine member, in another preferred embodiment of the present invention, is a single, monolithic body of concrete.

In accordance with a further principal feature of the present invention said spine member, in yet another preferred embodiment of the present invention, is provided at its opposite ends with abutment frame means which are deeply embedded in the concrete of said spine member and which include abutment portions which project from the upper surface of the concrete of said spine member and are adapted to support anchor receiving means to which reinforcing wires can be anchored.

In accordance with a yet further principal feature of the present invention said spine member is provided with mold alignment guides which are affixed to its top surface.

In accordance with another principal feature of the present invention at least one end of each of said reinforcing wires is anchored to one of said anchor receiving means by anchoring means, which anchoring means includes a threaded rod passing through a hole in said anchor receiving means and a nut engaged with said threaded rod for adjusting the tension in its associated reinforcing wire.

In accordance with yet another principal feature of the present invention each of said anchoring means includes an intermediate body interposed between said threaded rod and said reinforcing wire, and a strain gauge coupled to said intermediate body for use in measuring the tension in said reinforcing wire.

In accordance with another principal feature of the present invention a bulbous protrusion or button is attached to an end of said reinforcing wire and said anchoring means includes coupling means which is adapted to receive said end of said reinforcing wire and to prevent said protrusion from escaping from said coupling means.

In accordance with a yet further principal feature of the present invention the spine member of a balanced compression embodiment of the present invention is provided with elevating means for elevating it above the surface by which it is supported, said elevating means defining, with said spine member, a passage which extends beneath said spine member and substantially from end to end thereof.

In accordance with another principal feature of the present invention said balanced compression embodiment of the present invention further includes first and second bridge means each of which confronts one end of said spine member, projects above the upper surface of said spine member, and confronts said passage.

In accordance with yet another principal feature of the present invention at least one tension resisting member extends from end to end of said passage and is affixed to the lower ends of said bridge means.

In accordance with a further principal feature of the present invention the upper ends of said bridge means are provided with anchor receiving means whereby the opposite ends of reinforcing wires can be anchored to said bridge means.

In accordance with a yet further principal feature of the present invention the anchoring means attached to one of said anchor receiving means comprises strain gauge means.

In accordance with another principal feature of the present invention rails are provided on each side of said spire member, which rails are adapted to support a straddle truck straddling said spine member.

In accordance with yet another principal feature of the present invention mold raising means are provided whereby the mold or molds carried by said spine member can be raised from and lowered to the upper surface of said spine member.

In accordance with a further principal feature of the present invention certain preferred embodiments thereof include computer means and printer means associated with all of the strain gauges incorporated in said anchoring means and adapted to provide printed reports of the tension in each of the reinforcing wires of a set of reinforcing wires simultaneously mounted on the device of said preferred embodiment.

In accordance with a yet further principal feature of the present invention a method of manufacturing prestressed reinforced concrete railroad ties comprises the steps of tensioning a set of reinforcing wires between the ends of a single, aboveground spine member, and individually adjusting the tension in each such reinforcing wire.

In accordance with another principal feature of the present invention said method of manufacturing prestressed reinforced concrete railroad ties includes the step of printing a tabulation of the tension in each individual reinforcing wire as measured by strain gauges incorporated in one of the anchoring means associated with each reinforcing wire.

For a fuller understanding of the nature and objects of the present invention, reference should be had to the following detailed description, taken in connection with the accompanying drawings.

DESCRIPTION OF THE PREFERRED EMBODIMENTS

Figures 1, 1A, 1B:
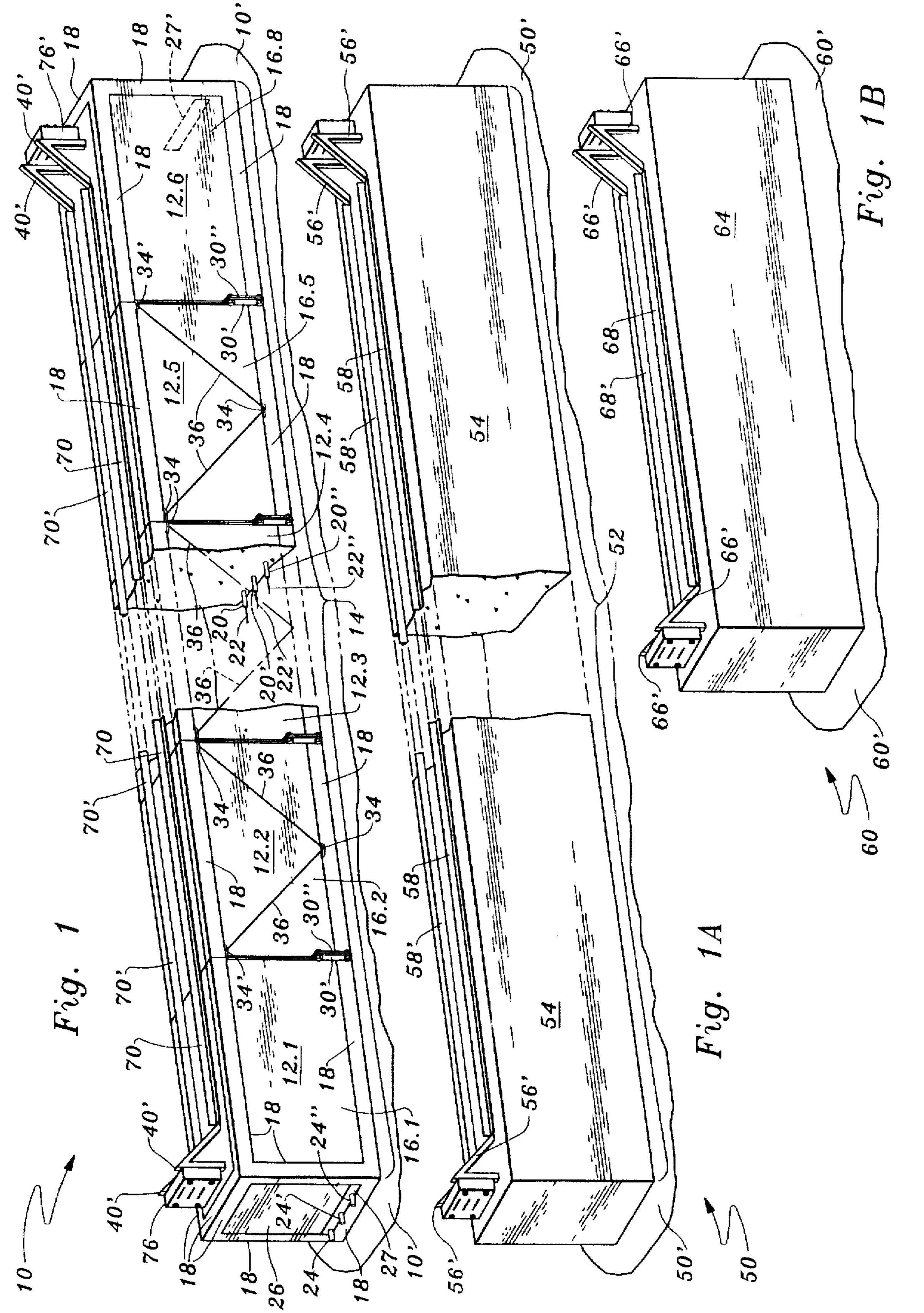
FIG. 1 is a partial perspective view of an apparatus for the manufacturing of prestressed reinforced concrete railroad ties embodying the present invention.
FIGS. 1A and 1B are partial perspective views of an alternate form of an apparatus for the manufacturing of prestressed reinforced concrete railroad ties embodying the present invention.

Referring now to FIG. 1, there is shown in part an apparatus 10 constructed in accordance with the present invention for use in the manufacturing of prestressed reinforced concrete railroad ties.

As seen in FIG. 1, apparatus 10 is comprised of an elongated, mutually abutting array of modules 12.1, 12.2, 12.3, etc., which modules are joined together at their abutting faces to form a single, elongated structural member 14 which is sometimes called the "spine" herein.

The convention is adopted herein of designating all of said modules in any apparatus 10 of the present invention, collectively, and also of designating any individual one of said modules in general, by the reference numeral 12. Thus, all of the modules 12.1 through 12.6 (FIG. 1) may sometimes be referred to as the "modules 12" herein, and any one of the modules 12.1, 12.2, 12.3, etc., may sometimes be referred to herein as "a module 12".

It is also to be understood that while the modules 12 shown in FIG. 1 are respectively designated by the reference numerals 12.1 through 12.6, apparatus 10 is not necessarily comprised of six modules 12. Rather, apparatus 10 may in some embodiments of the present invention be comprised of a sufficient number of modules 12 so that its total length is several hundred feet.

In keeping with the terminological practice of the art, an apparatus 10 comprised of three or more modules 12 will sometimes be referred to as a "long line".

On the other hand, it is also contemplated as part of the present invention that certain embodiments of apparatus 10 may be comprised of as few as two modules 12.

Figure 2:
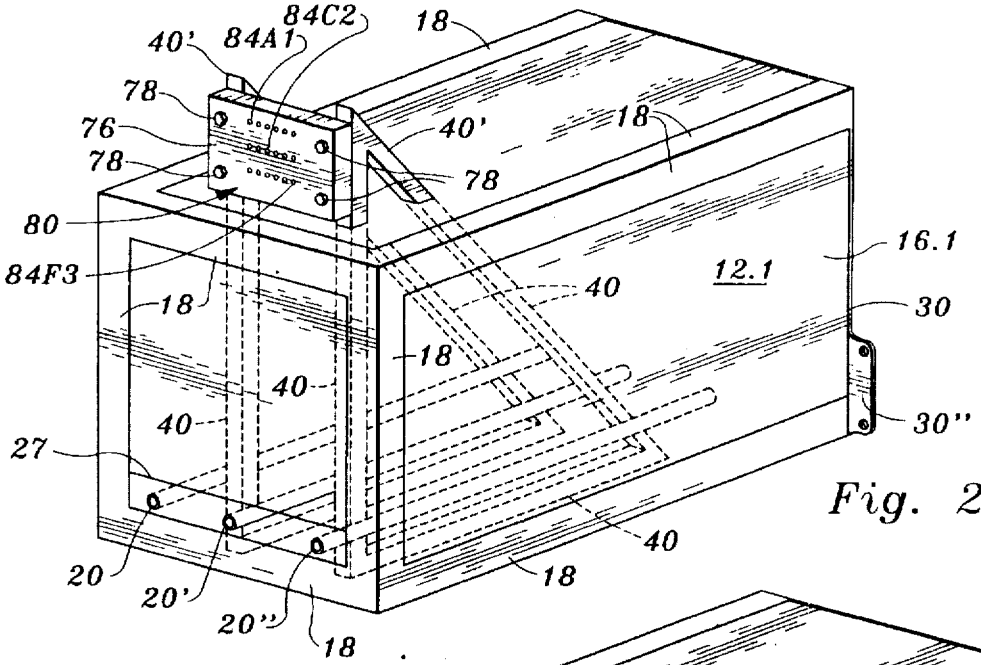
FIGS. 2 and 3 are partial perspective views of modules of the apparatus of FIG. 1.
Figure 3:
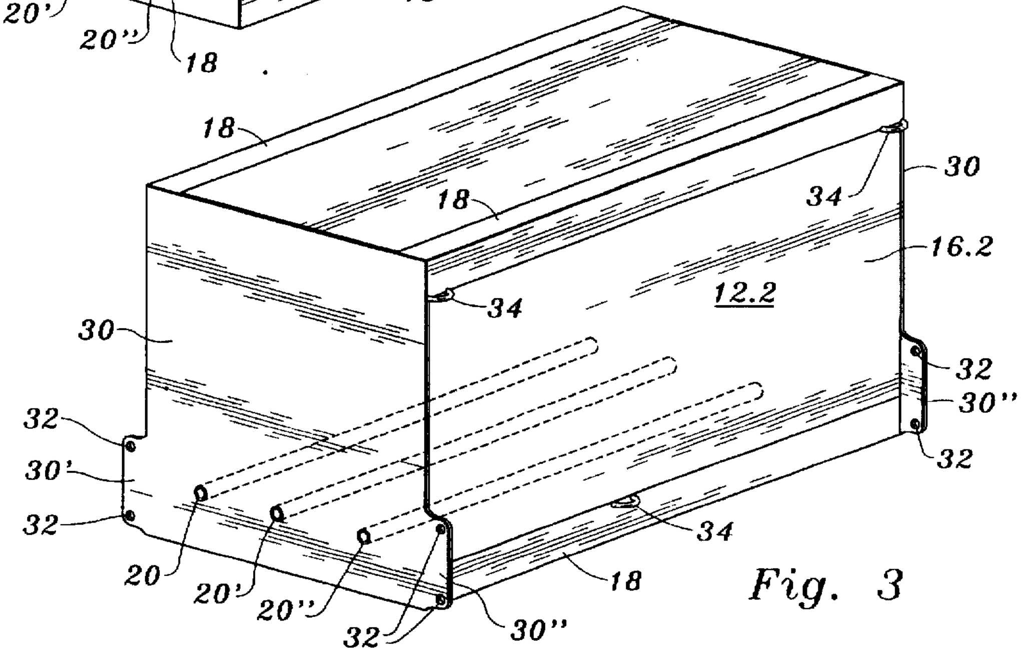

As will also be evident to those having ordinary skill in the art from a comparison of FIGS. 1, 2 and 3, as described herein, there are two classes of module 12, i.e., "terminal modules", such as modules 12.1 and 12.6 shown in FIG. 1, and "intermediate modules", such as modules 12.2, 12.3, 12.4, and 12.5, shown in FIG. 1.

A typical terminal module is more particularly described hereinbelow in connection with FIG. 2; and a typical intermediate module is more particularly described hereinbelow in connection with FIG. 3.

As further seen in FIG. 1, each module 12 is principally comprised of a solid, generally rectangular block of concrete; each of which blocks is designated herein by a particular reference numeral, e.g., 16.1, or by the general reference numeral 16, following the same convention observed in connection with the designation of the above-described modules.

As also seen in FIG. 1, the edges of the blocks 16 which are fully exposed when the part of apparatus 10 shown in FIG. 1 is assembled are protected by corresponding lengths of angle iron 18.

Referring now to FIGS. 2 and 3, it will be seen that a set of three tubes 20, 20', 20" passes through each block 16 and extends longitudinally from end to end thereof. The tubes 20, 20', 20" (sometimes collectively designated by the reference numeral 20) in each block 16 are suitably located in the mold when that block 16 is molded so that they will be located in the positions shown in FIGS. 2 and 3, relatively to the bottom face and the outer vertical faces of that block 16.

It is also to be noted from FIGS. 1, 2 and 3 that each of the tubes 20, 20', 20", i.e., the tubes 20, in every block 16 is so located that when the blocks 16 of any apparatus 10 are aligned and joined together as indicated in FIG. 1, all of the tubes 20 in that apparatus will be aligned, all of the tubes 20' in that apparatus will be aligned, and all of the tubes 20" in that apparatus will be aligned.

Thus, as best seen in FIG. 1, a cable 22 extends through all of the aligned tubes 20 from end to end of apparatus 10, a cable 22' extends through all of the aligned tubes 20' from end to end of apparatus 10, and a cable 22" extends through all of the aligned tubes 20" from end to end of apparatus 10.

As also best seen in FIG. 1, a set of cable clamps 24, 24', 24" of well known type are clamped to the ends of cables 22, 22', 22", respectively, which project a short distance through the end 26 of apparatus 10, and through a protective steel plate 27 which bears against the exposed concrete face of end 26.

A suitable protective steel plate 27' is provided at the other end of apparatus 10, i.e., abutting the exposed concrete face of the exposed end of module 12.6.

A corresponding set of cable clamps 28, 28', 28" (not shown) are clamped to the respective opposite ends of cables 22, 22', 22", after suitably tensioning cables 22, 22', 22", and thus all of the modules 12 of apparatus 10 are firmly joined together when the part of apparatus 10 shown in FIG. 1 is fully assembled.

As best seen in FIGS. 2 and 3, a steel butt plate 30 is affixed to each end of each intermediate module 12 (FIG. 3), and a single steel butt plate 30 is affixed to the inner end of each terminal module 12 (FIG. 2).

Butt plates 30 may be affixed to their corresponding ends of modules 16 by being arc welded to the adjacent ends of abutting edge protectors 18 before each frame comprised of butt plates and their associated edge protectors is emplaced in the mold in which the corresponding block 16 is to be molded.

As best seen in FIG. 3, each butt plate 30 is provided with two ears 30', 30", each of which ears is provided with a pair of bolt-receiving holes 32.

When modules 12 are aligned to form apparatus 10 (FIG. 1) each pair of mutually confronting ears 30 is joined together by bolts passing through aligned pairs of holes 32, and associated nuts, thus maintaining modules 12 in rigidly maintained, mutually joined juxtaposition.

In accordance with well known practice, it may be found desirable to interpose a layer of grout between butt plates 30, which grout sets after modules 12 have been finally aligned.

As best seen in FIG. 3, eyes 34 are affixed to the edge protectors 18 of each intermediate module 12, as by arc welding. It is to be understood that both of the upper edge protectors 18 of every intermediate module 12 are provided with two eyes 18, at opposite ends thereof, and that both of the lower edge protectors 18 of every intermediate module 12 are provided with a single, centrally located eye 34.

Referring again to FIG. 1, it will be seen that a single, continuous cable 36 passes through all of the eyes 34 but the outermost eyes 34', and is fastened to outermost eyes 34' by means the provision of which is well within the scope of those having ordinary skill in the art.

It is to be understood that a substantially identical cable 36' coacts, in the same manner, with corresponding eyes 34' affixed to the opposite sides of the intermediate modules 12 of apparatus 10.

Thus it will be seen that all of the inter mediate modules 12 of apparatus 10 are further securely joined together by means of two cables 36, 36' one on each side of apparatus 10, coacting with the eyes 34, 34' located on the opposite major vertical sides of spine 14 of apparatus 10.

Comparing FIGS. 1 and 2, it will be seen that in each of the terminal modules 12.1, 12.6 of apparatus 10 there is embedded a pair of triangular abutment frames 40.

As best seen in FIG. 2, each abutment frame 40 fabricated from heavy steel bar stock of rectangular cross-section, and the separate legs thereof are joined together into a single, unitary whole, as by arc welding.

As also seen in FIG. 2, a part 40' of each abutment frame projects above the upper surface of concrete block 16.1. These projecting portions 40' of abutment frames 40 will generally be called "abutments" herein.

Thus, it will be under stood that a pair of abutment frames 40 is incorporated into each of the terminal modules 12.1, 12.6 of apparatus 10 during the molding of the corresponding concrete blocks 16.1, 16.6; and that each of these abutment frames 40 projects above the upper surface of its corresponding concrete block 16.1, 16.6 to form an abutment 40'.

The spine 14 of apparatus 10 described hereinabove is of the type designated herein as a "modular spine".

Referring now to FIG. 1A there is shown an alternatives apparatus 50, constructed in accordance with the present invention, for use in the manufacturing of prestressed reinforced concrete railroad ties.

As seen in FIG. 1A, apparatus 50 is comprised of a monolithic, solid concrete spine 52, which is formed as a single block 54 of concrete, poured at the site at which apparatus 50 is to be used in the manufacturing of prestressed reinforced concrete railroad ties.

It is to be understood that it is a principal teaching of the present invention that certain parts of apparatus of the invention for use in the manufacturing of prestressed reinforced concrete railroad ties (sometimes called "permanent parts" or "monosite parts" herein) should be fabricated at the manufacturing site at which they are to be used, while other more portable and generally more complex and expensive parts of such apparatus (sometimes called "portable parts" or "multisite parts" herein) should be moved from manufacturing site to manufacturing site, leaving the permanent or monosite parts at the manufacturing site at which they are fabricated in contemplation of subsequent manufacture there, or disposing of the permanent or monosite parts near the manufacturing site at which they were fabricated.

Spine 52, then, would be such a permanent part, while modules 12 (FIG. 1) might be treated as either permanent parts or portable parts, depending upon the availability of materials, cost of fabrication, etc., at the respective intended manufacturing sites.

Referring again to FIG. 1A, it will be seen that four abutments 56' project from the upper surface of spine 52, two at each end thereof.

As will be understood by those having ordinary skill in the art, informed by the present disclosure, abutments 56' are projecting parts of abutment frames 56, which are embedded in spine 52 during its fabrication, in the same manner in which the abutment frames 40 of apparatus 10 (FIG. 1) are embedded in their corresponding concrete blocks 16.1 and 16.6.

As will be clear to those having ordinary skill in the art, apparatus 50 will sometimes hereinafter be called a "monolithic spine embodiment" of the present invention, as distinct from apparatus 10 (FIG. 1) which, as noted above, is sometimes called herein a "modular spine embodiment".

Referring now to FIG. 1B, there is shown an apparatus 60 of the present invention which is substantially identical to apparatus 50, but for its length.

In accordance with the principles of the present invention monolithic spine apparatus thereof may be made in any economically feasible length, ranging from the "long line" version shown in FIG. 1A to the single tie version shown in FIG. 1B.

Comparing FIGS. 1, 1A and 1B, it will be seen that each of the apparatuses depicted therein is disposed upon a support surface which is designated by the same reference numeral as that assigned to the apparatus itself, primed. Thus, the support surface under apparatus 10 is designated by the reference numeral 10', the support surface under apparatus 50 is designated by the reference numeral 50', and the support surface under apparatus 60 is designated by the reference numeral 60'.

It is thus to be understood that, in accordance with a principal feature of the present invention, it is not necessary to provide an inground foundation for a manufacturing apparatus of the present invention. To the contrary, the manufacturing apparatus of the present invention are aboveground apparatus, which are independent from the support surfaces upon which they are disposed during tie manufacturing. The only requirement for the supporting surface underlying a manufacturing apparatus of the present invention is that it be sufficiently solid and rigid to support the weight of the apparatus and its associated equipment without deforming or degrading.

Referring again to FIG. 1B, it will be seen that the spine 64 of apparatus 60 thereof is a single, monolithic block of concrete.

It will also now be evident to those having ordinary skill in the art, informed by the present disclosure, that each abutment 66' shown in FIG. 1B is a projecting portion of a corresponding abutment frame 66 which is embedded in concrete block 64 in the same manner in which four abutment frames 56 are embedded in spine 52 of apparatus 50 to provide four abutments 56'.

Referring again to FIG. 1, it will be seen that a pair of mold alignment guides 70, 70' are affixed to the top of spine 14, extend from terminal module 12.1 to terminal module 12.6, and extend over and are affixed to the top of each terminal module 12.1 and 12.6.

Guides 70 and 70' may be affixed to the upper faces of the modules 12 of spine 14 by mans of studs projecting from the upper faces of modules 12, the lower portion of each such stud being embedded in its associated concrete block 16. In accordance with this arrangement, the horizontal flange of each guide 70, 70' is provided with holes adapted to receive the corresponding ones of said studs, and nuts engaged with said studs and overlying said horizontal flanges secure guides 70, 70' to the top of spine 14.

As seen in FIG. 1A, a pair of mold alignment guides 58, 58' are affixed to the top of spine 52, preferably in the same manner in which guides 70, 70' are affixed to the top of spine 14 (FIG. 1).

Similarly, a pair of mold alignment guides 68, 68' are affixed to the top of spine 64 (FIG. 1B).

Referring again to FIG. 1, it will be seen that a terminal plate 76 is affixed to its associated abutments 40, 40', and that a terminal plate 76' is affixed to its associated abutments 40, 40'.

As best seen in FIG. 2, which is an enlarged view of terminal module 12.1, terminal plate 76 is affixed to its associated abutments 40' by means of bolts 78, the threaded ends of which bolts are engaged in tapped holes in the vertical members of associated abutments 40'.

It is to be understood that terminal plate 76' (FIG. 1) is affixed in the same manner to its associated abutments 40, 40'.

As also seen in FIG. 2, terminal plate 76 is provided with an array 80 of holes, each of which holes is adapted to receive a terminal end of one of the anchoring assemblies by which one end of a reinforcing wire or rod is anchored during the manufacture of a prestressed reinforced concrete railroad tie by means of apparatus 10.

Figure 18:
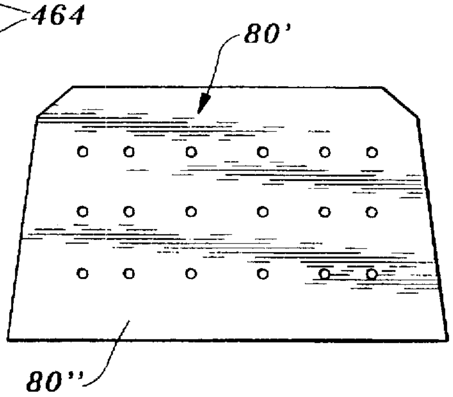
FIG. 18 is a cross-sectional view of a typical prestressed reinforced concrete railroad tie.

While, for clarity of illustration, array 80 shown in FIG. 2 is an essential uniform rectilinear array, it will be understood by those having ordinary skill in the art that the usual reinforcement array in a typical prestressed reinforced concrete railroad tie is somewhat irregular, as is the typical array 80' shown in FIG. 18, and there related to the cross-sectional outline of the tie 80" of which the wires of the array 80' are a part.

Figure 4:
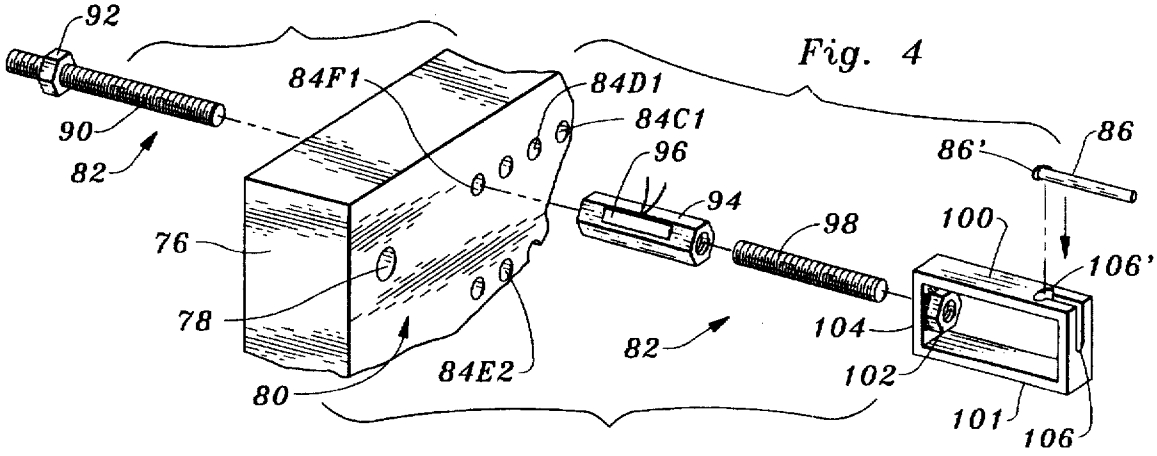
FIG. 4 is an enlarged perspective view of the anchoring means of a particular embodiment of the present invention for anchoring reinforcing wires to anchor receiving means thereof.

Referring now to FIG. 4, there is shown a part of terminal plate 76, one of the tapped holes 78' for receiving the threaded end of one of the bolts 78 (FIG. 2), some of the holes of array 80 (FIG. 2), and one of said anchoring assemblies. Each of said anchoring assemblies may be designated herein by the general reference numeral 82.

Correspondingly, the holes of array 80 will collectively be designated herein by the reference numeral 84, and any single hole of array 80 may be designated by the reference numeral 84, where it is not necessary or desirable to designate a particular hole 84 of array 80.

Where, however, it is desirable to designate a particular hole of array 80, or a particular corresponding anchoring assembly or reinforcing wire, the convention will be adopted herein of individually designating each hole in array 80, etc., by the corresponding column designating letter and row designating number in array 80 as viewed from beyond the end of apparatus 10 shown at the left-hand side of FIG. 1, and also shown in full at the left-hand side of FIG. 2.

As best seen in FIG. 2, the holes 84 of array 80 will be considered to be arrayed in vertical columns A through F, and in horizontal rows 1 through 3.

Thus, it will be seen that the upper left-hand hole in array 80 (FIG. 2) may be uniquely designated by the designator 84A1.

Similarly, the lower right-hand hole 84 in array 80 (FIG. 2) may be uniquely designated by the designator 84F3; and the third hole from the left-hand end of the middle row of array 80 (FIG. 2) may be uniquely designated by the designator 84C2.

The associated individual anchoring assemblies and reinforcing wires will be designated by designators having the same column and row designators as those of their associated holes 84.

Thus, the anchoring assembly 82 shown in FIG. 4 may be uniquely designated by the designator 82F1, and the reinforcing wire anchored at one of its ends by anchoring assembly 82F1 (FIG. 4) may be uniquely designated by the designator 86F1.

Referring again to FIG. 4, it will be seen that anchoring assembly 82F1 consists of a first threaded rod 90, a nut 92, an elongated hexagonal nut 94 of the kind sometimes called a "rod coupler", a strain gauge 96 which is affixed to elongated nut 94 in the well known manner, e.g., by cementing, a second threaded rod 98, and a coupler 100.

Coupler 100, which is a principal feature of the present invention, is comprised of a steel frame 101 having a nut 102 affixed to one of the smaller sides 104 thereof, in alignment with a hole passing through side 104, and a slot 106 in the other end thereof which is adapted to receive one end of associated reinforcing wire 86.

As indicated in FIG. 4, nut 92 is engaged with the threads of threaded rod 90 which passes through hole 84F1. The other end of threaded rod 90 is threaded into the tapped passage of nut 94. Threaded rod 98 is threaded into the other end of the tapped bore of nut 94, and is also threaded into nut 102.

As also indicated in FIG. 4, the end of reinforcing wire 86 shown in that figure is provided with a bulb 86', as by braising a nut or sleeve thereon, in accordance with a principal teaching of the present invention, and is then dropped into slot 106 of coupler 100, bulb 86' passing through the enlarged end 106' of slot 106.

In accordance with a principal feature of the present invention, the threads of rod 90, nut 92 and nut 94 are of the Acme or buttress-type, and the buttress-type threads, when used, are oriented for maximum force and wear qualities in the direction producing tension in reinforcing wire 86, i.e., with the face of the thread making the greatest angle with the axis of the thread facing reinforcing wire 86. In this manner, the life of threaded rod 90 and nuts 92 and 94 is extended as much as possible.

As will now be evident to those having ordinary skill in the art, informed by the present disclosure, each end of each reinforcing wire 86, during the production of one or more prestressed reinforced concrete railroad ties by apparatus 10, is anchored at each end by means of an anchoring assembly substantially identical to the anchoring assembly 82 described immediately above, half of these anchoring assemblies 82 being engaged with the arrayed holes in terminal plate 76 (FIG. 1), and the other half of these anchoring assemblies being engaged with the holes in terminal plate 76' (FIG. 1).

As will become evident hereafter to those having ordinary skill in the art, each apparatus of the present invention is provided at its opposite ends with different reinforcing wire anchoring assemblies. For example, nuts 94 and strain gauges 96 (FIG. 4) need be provided at only one end of any apparatus of the invention. At the opposite end of the same apparatus each threaded rod 90, bearing nut 92, may pass through its associated hole 84' in terminal plate 76', and then be threaded into the nut 102 of its associated coupler 101.

Thus, for clarity, the end of any apparatus of the present invention which includes the strain gauges will be called the "first end" or "instrumented end" thereof, and the other end of the same apparatus of the present invention will, correspondingly, be called the "second end" or "uninstrumented end".

Figure 5:
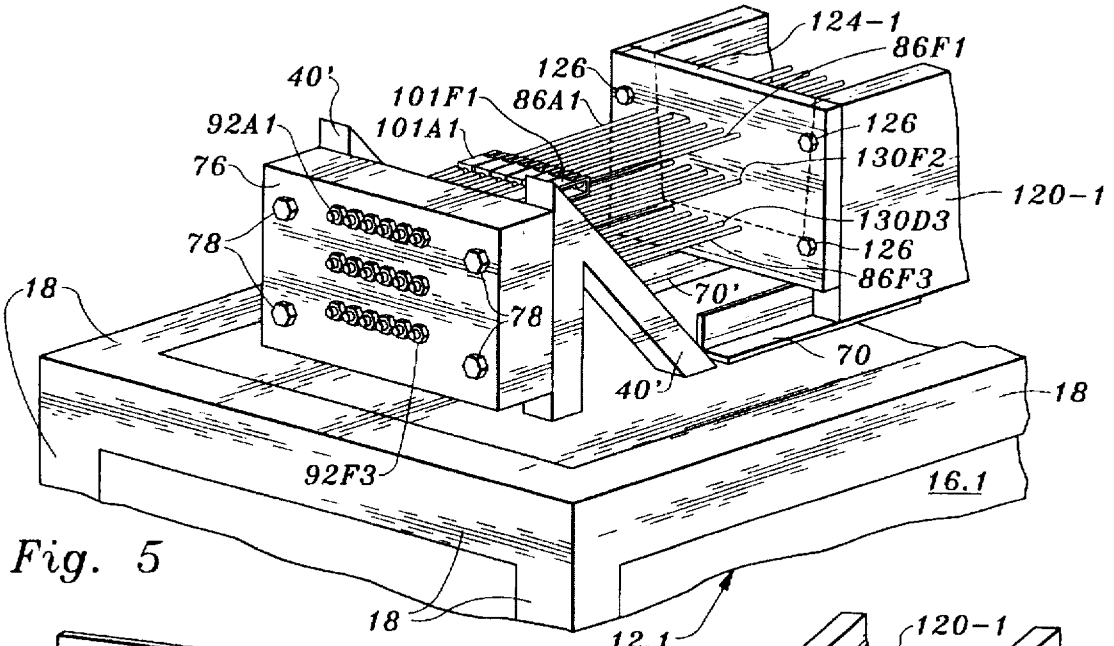
FIG. 5 is a partial perspective view of the apparatus of FIG. 1 having at least one railroad tie mold mounted thereupon are reinforcing wires stretched in tension between the anchor receiving means thereof.

Referring now to FIG. 5, there is shown the first or instrumented end of the apparatus of FIG. 1, at that stage of the manufacturing of a plurality of prestressed concrete railroad ties when a full set of reinforcing wires 86 have been anchored at their respective ends and correctly tensioned, and just prior to the filling of the associated molds 120 with concrete.

As also seen in FIG. 5, a plurality of tie molds 120, only the first one of which, 120-1, is shown, are emplaced on mold alignment guides 70, 70'.

Mold 120-1 is provided with an end plate 124-1, which is affixed to the outer end of mold 120-1 by means of suitable bolts 126.

Figure 6:
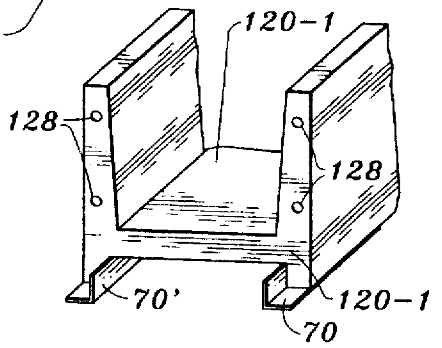
FIG. 6 is a partial perspective view of a railroad tie mold and the manner of its coaction with the mold alignment guides of the apparatus of the invention.

As seen in FIG. 6, the outer end 120-1' of mold 120-1 is provided with a plurality of threaded cylindrical inserts 128 which are adapted to receive and engage bolts 126.

End plate 124-1 is provided with an array of holes 130 which correspond in array geometry to the holes 84 in terminal plate 76. Holes 13 are of sufficient size to accommodate the bulbs 86' of the reinforcing wires 86, but closely surround each reinforcing wire 86, whereby to minimize the leakage of concrete from mold 120-1.

It is to be understood that a substantially identical end plate 124-2 is bolted to the outer end of the mold which is located at the opposite end of mold alignment guides 70, 70'.

Figure 7:
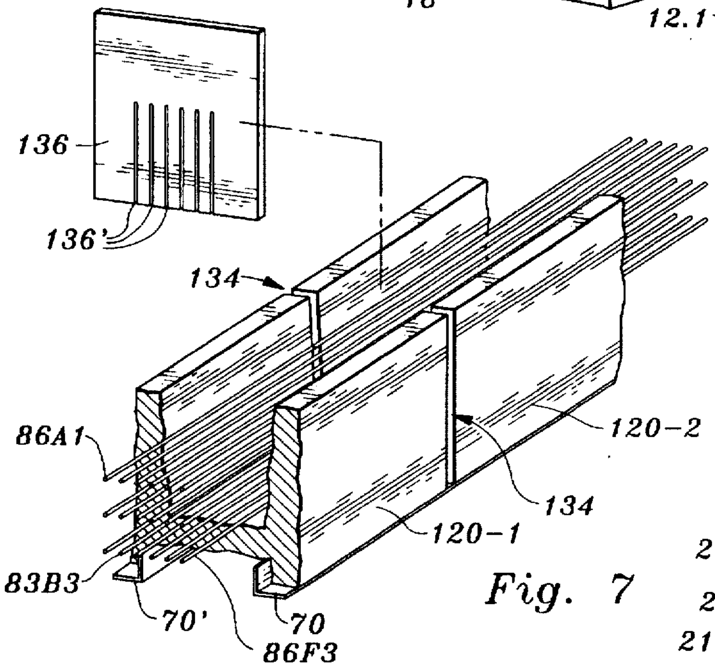
FIG. 7 is a partial perspective view of two railroad tie molds mounted upon an apparatus of the invention and having a complete set of tension reinforcing wires passing therethrough.

Referring now to FIG. 7, there is shown the gap 134 between tie mold 120-1 and adjacent tie mold 120-2. In accordance with a principal feature of the present invention this gap may be as little as ½ inch, thereby affecting considerable reinforcing wire cost savings as compared with prior art methods and apparatus for the manufacture of prestressed reinforced concrete railroad ties.

Also shown in FIG. 7 is the divider 136 which is placed between molds 120-1 and 120-2 after wires 86 and molds 120 have been positioned on appartus 10 as shown in FIG. 7. In the known manner, the slots 136' in divider 136 receive the respective wires 86 of the vertical columns A through F.

It is to be understood that a similar divider will be positioned between each adjacent pair of tie molds 120 arrayed on guides 70, 70' of apparatus 10.

Figure 7A:
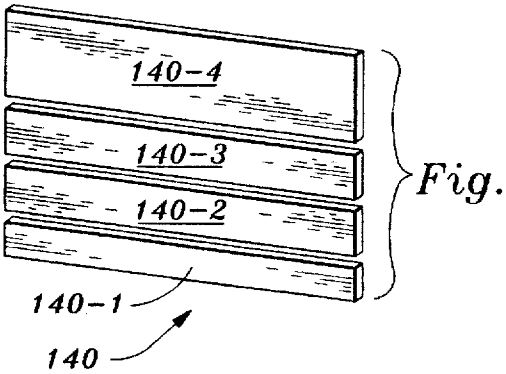
FIG. 7A is a perspective view of a set of mold dividers of the kind which may be interposed between the railroad tie molds mounted upon an apparatus of the invention.

Referring now to FIG. 7A, there is shown an alternative form of divider 140 which may be used instead of divider 136 shown in FIG. 7.

As will be evident to those having ordinary skill in the art, informed by the present disclosure, element 140-1 will then be located immediately below horizontal array 86A3 through 86F3 of wires 86 in FIG. 7; element 140-2 will be located between horizontal arrays 86A3 through 86F3 of wires 86 and horizontal array 86A2 through 86F2 of wires 86; element 140-3 will be located between horizontal array 86A2 through 86F2 of wires 86 and horizontal array 86A1 through 86F1 of wires 86; and element 140-1 will extend vertically from the wires of horizontal array 86A through 86F1 to the top edge of molds 120-1 and 120-2.

It is to be understood that the apparatuses of the present invention may be considered to be divided into two types, viz., the unbalanced compression type, as shown in FIGS. 1 through 7A, and the balanced compression type as shown in FIGS. 8 through 10 and 15 through 17.

Figure 10:
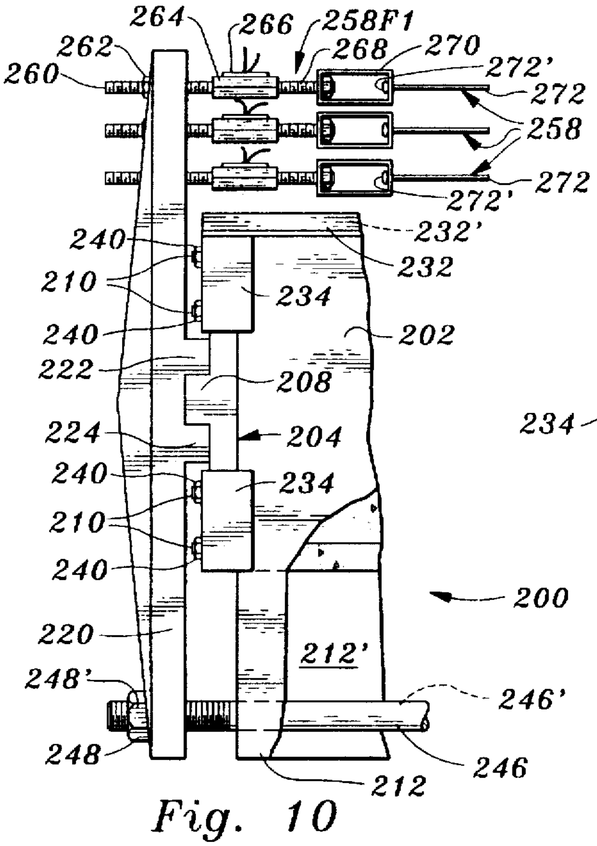
FIG. 10 is a partial elevational view, partly in section, of the apparatus of the present invention shown in partial perspective in FIG. 8.
Figure 8A:
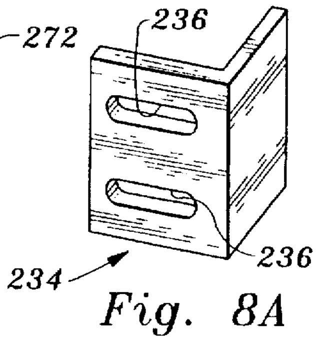
FIG. 8A is a perspective view of a part of the apparatus of the present invention shown in partial perspective view in FIG. 8.

The distinction between these two types of devices of the present invention can be seen, for example, by comparing FIGS. 2 and 10.

As there seen, the devices of the unbalanced compression type of device resist the forces produced by the tension in the wires tensioned thereby only by the resistance of the spine (e.g., spine 14) to being ruptured by the breaking of the abutment frames 40 out of the spine 14; whereas in the devices of the second or balanced compression type (FIG. 10) the forces produced by the wires 86, under tension, are balanced by the compressive forces produced by the heavy counterbalancing rod elements (e.g., 246, 246') located below the spine.

Figure 8:
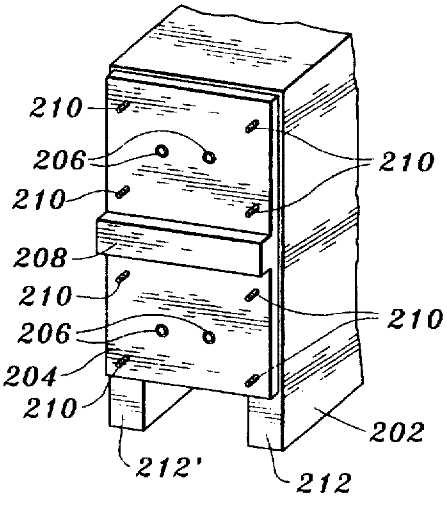
FIG. 8 is a partial perspective view of the spine of a balanced compression railroad tie manufacturing apparatus of the present invention.
Figure 9:
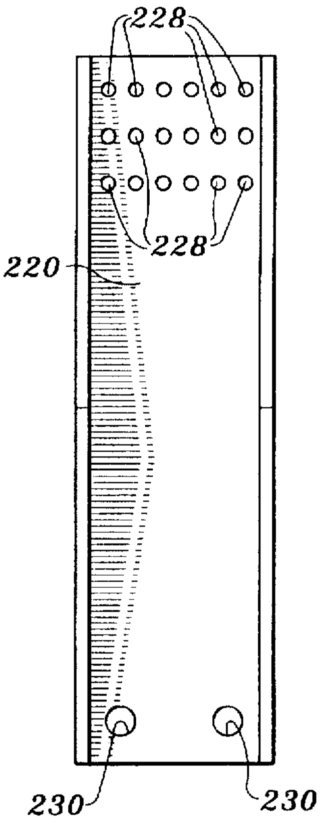
FIG. 9 is an elevational view of one of the bridge members of the apparatus of the present invention shown in part in FIG. 8.

In FIGS. 8 through 10 there is shown an apparatus 200 of the present invention for use in manufacturing prestressed reinforced concrete railroad ties which is of the balanced compression type.

Referring now to FIG. 8, there is shown one end of spine 202 of apparatus 200, to which a reinforcing plate 204 is affixed by means of bolts 206, which extend into cylindrical threaded inserts in spine 202, the recessed heads of bolts 206 only being shown in FIG. 8.

It is to be noted that a transverse rib 208 projects outwardly from the main body of reinforcing plate 204, and that a plurality of studs 210 are provided on plate 204 for a purpose which will be explained hereinafter.

It is also to be noted that spine 202 is provided with longitudinal flange-type legs 212, 212'.

Spine 202 is a monolithic concrete member the length of which is determined by the number of tie molds which are to coact therewith, and a reinforcing plate 204' substantially identical to reinforcing plate 204 is affixed to the opposite end of spine 202.

It is to be understood that the term "monolithic" as used herein does not denote a concrete member consisting solely of concrete, but rather denotes a unitary concrete member, whether reinforcing rods or the like are included therein or not.

Comparing FIGS. 9 and 10, it will be seen that apparatus 200 further comprises a bridge member 220 having a pair of ribs 222, 224 which closely embrace rib 208 of plate 204 when apparatus 200 is assembled.

As seen in FIG. 9, bridge 220 is provided at its upper end with an array of holes 228 which are arrayed in an array similar to the reinforcing rod array of the railroad ties which are to be manufactured by means of apparatus 200.

Bridge 220 (FIG. 9) is also provided, at its lower end, with a pair of holes 230 the purpose of which will be explained hereinafter.

Referring again to FIG. 10, it will be seen that spine 202 is provided with mold alignment guides 232, 232' similar to guides 70, 70' shown in FIG. 1, and having the same purpose.

Apparatus 200 also includes four L-brackets 234, having a pair of elongated holes 236 in one branch thereof.

As see in FIG. 10, all four brackets 234 are secured to plate 204 by means of studs 210 (FIG. 8) and their associated nuts 240. L-brackets 234 serve to grasp the end of spine 202, thus preventing transverse shifting of plate 204 when it is being attached to spine 202.

As further seen in FIG. 10, a pair of countertension rods 246, 246' extend from end to end of spine 202, passing between legs 212, 212' thereof.

Countertension rods 246, 246' are secured to bridges 220, 220' located at opposite ends of spine 202, by means of bolts 248, 248' located at the end of apparatus 200 shown in FIG. 10 and bolts 248" and 248'" located at the opposite end of spine 202.

Comparing FIG. 9 and 10, it will be seen that a set of sixteen anchoring assemblies 258 are engaged with corresponding holes 228 in bridge 220 in the same manner in which anchoring assemblies 82 are engaged with terminal plate 76 in FIG. 4. Each anchoring assembly 258 is comprised of a threaded rod 260, a nut 262, an elongated hexagonal nut 264 to which is affixed a strain gauge 266, a second threaded rod 268, and a coupler 270 with which the end of a reinforcing wire 272 having a bulb 272' at its end is engaged. The parts of each anchoring assembly 258 are substantially identical to the corresponding parts of the anchoring assembly 82 shown in FIG. 4.

When referred to any particular one of said anchoring assemblies 258, or any particular part of one of said anchoring assemblies, the convention for designating individual anchoring assemblies, etc., set out hereinabove in connection with array 80, etc., is also adopted in the present discussion of anchoring assemblies 258. Thus, the anchoring assembly shown at the top of FIG. 10 will sometimes be designated by the designator 258F1 herein, and the anchoring assembly shown at the bottom of the array seen in FIG. 10 will be designated by the designator 258F3.

Figure 12:
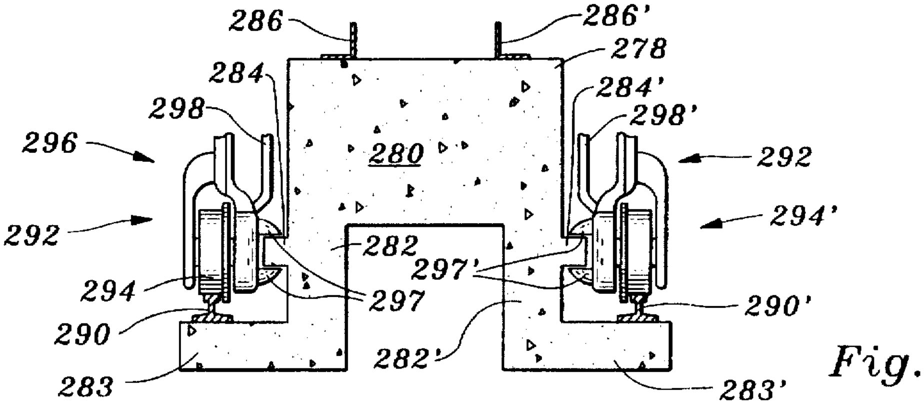
FIG. 12 is a partial sectional view of a railroad tie manufacturing apparatus of a particular embodiment of the present invention, including the rails provided for bearing a straddle truck which, in accordance with the present invention, straddles the spine of said apparatus.

Referring now to FIG. 12, there is shown a partial cross-sectional view of a monolithic spine embodiment of the present invention. Concrete spine 278 not only has a main body 280 and flange legs 282, 282', as in the first balanced compression-type embodiment of the present invention shown and described herein (FIGS. 8, 8A, 9 and 10), but also includes railbed wings 283, 283' and retarding ribs 284, 284'. It is to be understood also that spine 278 may have embedded in it reinforcing means for reinforcing either the railbed ribs 283, 283', or the retarding wings 284, 284', or both. Mold alignment guides 286, 286' will also be affixed to the top of spine 278.

As also seen in FIG. 12, a pair of rails 290, 290' are affixed to the respective tops of railbed wings 283, 283'.

Rails 290, 290' are adapted to bear a straddle truck generally designated by the reference numeral 292, the flanged wheels of which ride on the respective rails 290, 290'.

Straddle truck 292 is provided for the purpose of carrying the concrete supply means by which molds borne by guides 286, 286' are filled; concrete vibrators; lifting and handling equipment for lifting and handling molds, reinforcing wires, completed ties, etc.

It is to be understood as a principal feature of the present invention that rails 290, 290' may not only extend along spine 278, but also may extend throughout the yard or plant, i.e., the facility, in which apparatus 296 embodying spine 278, etc., and in some cases other apparatus of the same kind, are located.

Referring again to FIG. 12, it will be seen that, as a feature of the present invention, straddle truck 292 is provided with calliper clamps 297, 297', operated by handles 298, 298' to selectively frictionally grasp retarding ribs 284, 284', whereby straddle truck 292 can be locked in any desired position along spine 278.

Referring now to FIGS. 11, 13, 13A and 14, there are illustrated certain methods and apparatus of the present invention whereby the well known problem of handling rail fasteners during the manufacture of prestressed reinforced concrete railroad ties is solved, at least in part.

As is well known to those having ordinary skill in the art, rail fasteners are incorporated into modern concrete railroad ties by partial embedment of these rail fasteners into the upper faces of these railroad ties (known as "sleepers" in areas outside the United States).

For this purpose, i.e., for the incorporation of rail fasteners into concrete railroad ties, these ties are molded in their inverted state, with the upper surface of each tie being formed by the bottom of the mold.

Thus, in the general practice of the prior art before the teachings of the present invention, the rail fasteners for each tie were deposited in suitable mounts fixedly located in the bottom of the mold, before the filling of the mold with concrete.

While this practice resulted in the firm embeddment of the rail fasteners in the tie, considerable difficulty was sometimes encountered in removing the completed ties from the molds without damaging the tie or the bond between one or more fasteners and the tie body, due to the tendency of the concrete to cause the inserted rail fasteners to become adhered to the mold.

In accordance with a principal feature of the present invention, means are provided as part of certain apparatus of the present invention whereby individual molds can be slightly raised from the top of the spine of the apparatus and maintained in that slightly elevated position during the filling of the molds with concrete and the curing of the concrete, whereafter, the ties being cured in their molds, the respective molds are slightly dropped, and thus the rail fasteners, which are supported by small bosses mounted in the spines of the apparatus, remain embedded in the ties, which are now parted from their associated molds, and thus the rail fasteners are separated from their associated molds without damage to the molded ties or to the bonds between the molded ties and their associated rail fasteners.

Figure 11:
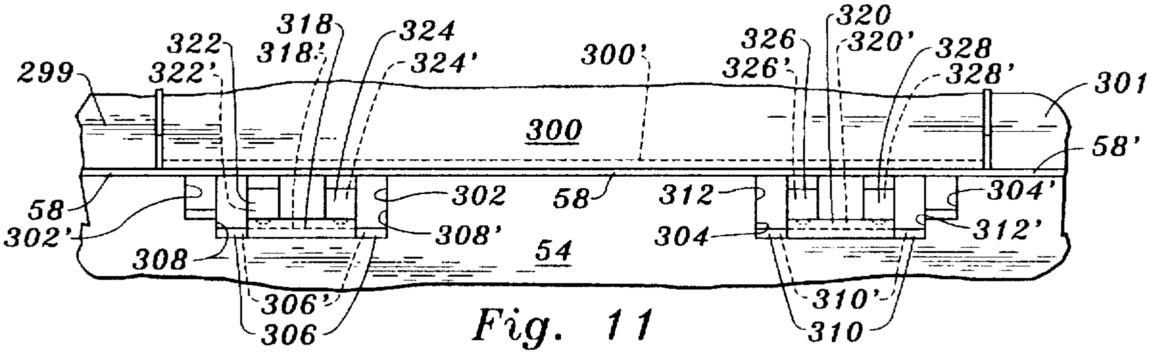
FIG. 11 is a partial elevational view of an apparatus of the present invention, particularly showning the mold raising and lowering apparatus which is a principal feature of the present invention.

Referring now to FIG. 11, then, there is shown in part the apparatus 50 of the present invention (FIG. 1A) modified to incorporate the specialized apparatus of the present invention whereby the abovedescribed method of the present invention is carried out.

As seen in FIG. 11, apparatus 10 includes an elongated monolithic concrete block 54 (FIG. 1A).

Also seen in FIG. 11, a tie mold 300 and parts of two adjacent tie molds 299, 301 are disposed upon the mold alignment guides 58, 58' (FIG. 1A), only the front edge of the horizontal flange of guide 58 being visible in FIG. 1A.

As further seen in FIG. 11, two transverse recesses 302, 304 each extend from side to side of spine 54 and to the top thereof, in such manner that guides 58, 58' pass over these recesses and, where they pass thereover, are unsupported by spine 54.

A recess 302' is located at and joined with transverse recess 302, and a recess 304' is located at the opposite end of and joined with transverse recess 304.

As will be seen in FIG. 11, major recesses 302, 304 extend completely through spine 54, but minor recesses 302', 304' do not.

It is to be understood that each recess 302', 304' is matched by a corresponding recess of the same kind which extends inwardly from the opposite major vertical face of spine 54. Recess 302' is shown in detail in FIG. 14 and discussed hereinbelow in connection with FIG. 14.

As also seen in FIG. 11, two ribs or tracks are raised upon the floor of recess 302, and extend completely from wall 308 to wall 308' of recess 302. Another pair of ribs 310, 310' are raised upon the floor of recess 304, and extend completely from wall 312 to wall 312' thereof. Each rib 306, 306', 310, 310' is located below the position occupied by the rail fasteners when they are properly located in the bottom of mold 300.

Movable support blocks 318, 318' are slidably mounted, respectively, on ribs 306 and 306', each block 318, 318' defining a groove in which its associated rib 306, 306' is received.

Similarly, movable support block 320, 320' are slidably mounted, respectively, on ribs 310 and 310', each block 320, 320' defining a groove in which its associated rib 310, 310' is received.

Thus, it will be seen that each one of the four support blocks 318, 318', 320, 320' is longitudinally slidable (parallel to the plane of FIG. 11) from sidewall to sidewall of the transverse recess in which it is located, but is not movable laterally, i.e., perpendicularly to the plane of FIG. 11.

Two cylindrical bosses 322, 324 project from the top surface of support block 318, and two cylindrical bosses 322', 324' project from the top surface of support block 318'.

Each boss 322, 324, 322', 324' is provided at its upper end with an adaptor adapted to receive and hold a rail fastener, with each such fastener extending through a close-fitting opening in the bottom of mold 300.

Similarly, two cylindrical bosses 326, 328 project from the top surface of support block 320, and two cylindrical bosses 326', 328' project from the top surface of support block 320'.

Each boss 326, 328, 326', 328' is provided at its upper end with an adaptor adapted to receive and hold a rail fastener, with each such fastener extending through a close-fitting opening in the bottom of mold 300.

Thus, it will be seen that by means of the apparatus located in transverse recesses 302, 304, as discussed immediately above, the rail fasteners which are to be incorporated in the tie which is to be molded in mold 300 can be supported in the correct position for embedment in the concrete in mold 300 when the bottom of mold 300 is located in the raised position indicated by the dashed line 300' (FIG. 11).

It will be seen by those having ordinary skill in the art, informed by the present disclosure, that when mold 300 is raised to the position indicated by dashed line 300, said rail fasteners are passed through said close-fitting openings and seated in said adapters, and mold 300 is filled with concrete, which is then allowed to cure, all of said rail fasteners will be correctly located in the concrete of the resulting tie body in mold 300.

If, then, mold 300 is dropped downwardly, below the position indicated by dashed line 300', the concrete tie body, and the rail fasteners, will be supported on bosses 322, 322', 324, 324', 326, 326', 328, and 328', and by the reinforcing wires passing therethrough which wires are also supported by dividers 140-1, 140-2, 140-3 (FIG. 7A).

Figure 14:
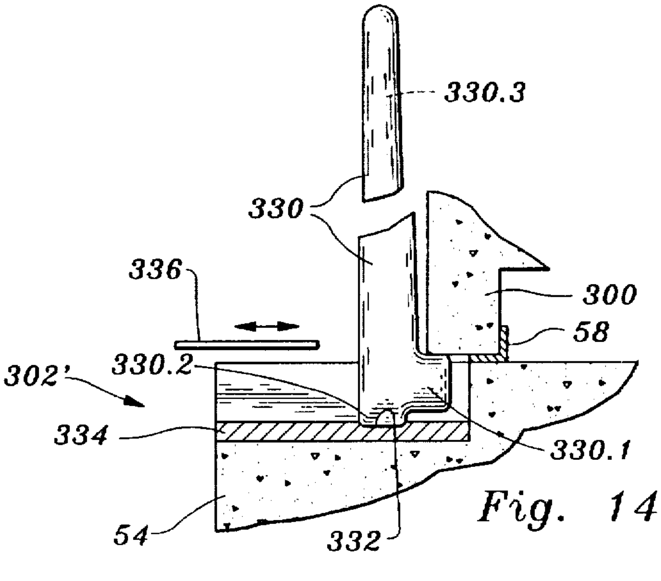

Simple methods and apparatus for thus raising and lowering mold 300, which methods and apparatus are principal features of the present invention, are illustrated in FIG. 14.

As there shown, a simple lever 330 can be inserted into recess 302', for example, with its short arm 330.1 contacting the bottom of mold 300 (FIG. 14), and the stub 330.2 of its long arm 330.3 received in recess 332 in floor plate 334 of recess 302'.

When four of such levers as lever 330 are thus emplaced in the four recesses 302', 304', etc., associated with mold 300, and simultaneously operated by four laborers, mold 300 can be raised to the extent indicated by dashed line 300' (FIG. 1), and four corresponding shims 336 (FIG. 14), etc., can be inserted between the horizontal flanges of guides 58, 58' and the bottom of mold 300, thus maintaining mold 300 in its raised position indicated by dashed line 300' until said four levers are again used to remove shims 336, etc. When said shims are thus removed, mold 300 will drop away from the completed tie, leaving said rail fasteners properly embedded in the just molded tie.

Figure 13:
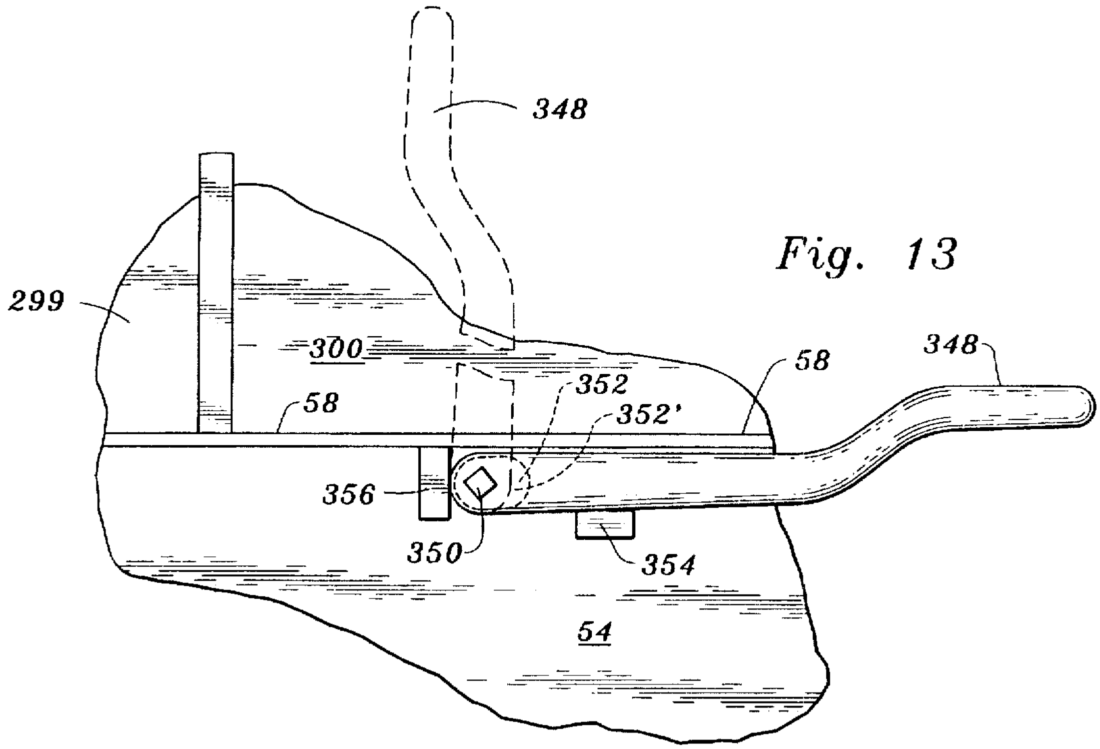
FIGS. 13, 13A and 14 show further features of the mold raising and lowering apparatus of the present invention.
Figure 13A:
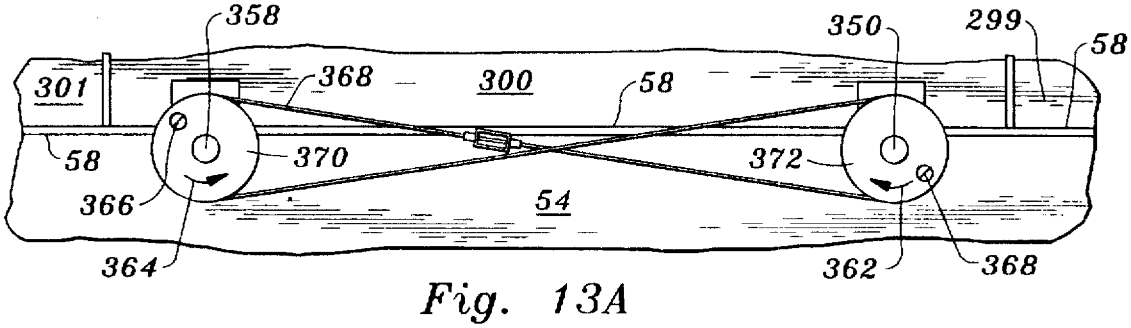

As seen in FIGS. 13 and 13A, a more sophisticated arrangement may be used to thus raise and lower mold 300.

In this case, lever 348 is removably fitted to one end of a pivot rod 350, the square end of pivot rod 350 and the corresponding square opening in the lower end of lever 348 irrotatably fixing lever 348 to pivot rod 350.

As seen in both FIGS. 13 and 13A, pivot rod 350 passes through a transverse tube which extends from major face to major face of spine 54 and is embedded therein.

Two cams 352, 352' are irrotatably affixed to pivot rod 350, and thus when lever 348 is manually operated from its solid line position to its dashed line position (FIG. 13), one end of mold 300 is raised by the amount of the rise of cams 352 and 352'.

As seen in FIG. 13, lever 348 can be operated from stop 354 to stop 356.

Since lever 348 is over center when it is in contact with stop 356, lever 348 will then remain in its dashed line position until manually operated toward stop 354, and thus mold 300 will remain in its raised position until lever 348 is manually operated toward stop 354.

Referring to FIG. 13A, which is a view from the opposite side of spine 54 from that shown in FIG. 13, it will be seen that pivot rod 350 and its associated pivot rod 358, which is located at the other end of mold 300 and carries two cams 360, 360' similar to and serving the same function as cams 352, 352 cooperate to raise and lower mold 300. It will be seen by those having ordinary skill in the art, informed by the present disclosure, that when pivot rods 350 and 358 are turned in opposite directions as indicated by arrows 362, 364 (FIG. 13A), all four cams 352, 352', 360, 360', will coact to raise mold 300.

As will be evident to those having ordinary skill in the art, informed by the present disclosure, cable 368, which is oppositely wound on pulleys 370, 372, and is affixed to each pulley by clamps operated by screws 366, 368, causes pulleys 370, 372 to operate in the mutually opposed directions shown by arrows 362, 364, or both in the opposite direction, and that thus the operation of lever 348 will be seen to cause mold 300 to rise or fall as discussed above. Other means, such as hydraulic cylinder means, may alternatively be used to raise and lower mold 300, all within the scope of the present invention.

Figure 15:
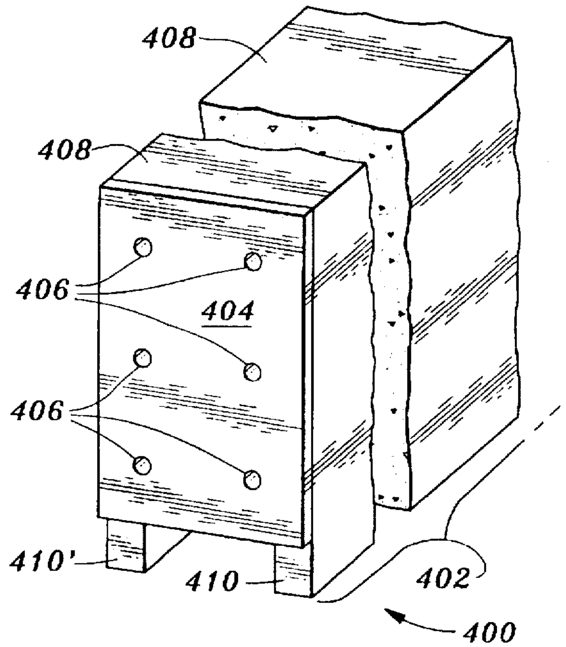
FIGS. 15, 16 and 17 illustrate an apparatus for the manufacturing of prestressed reinforced concrete railroad ties embodying the present invention, and more particularly the apparatus of a second balanced compression embodiment of the present invention.
Figure 16:
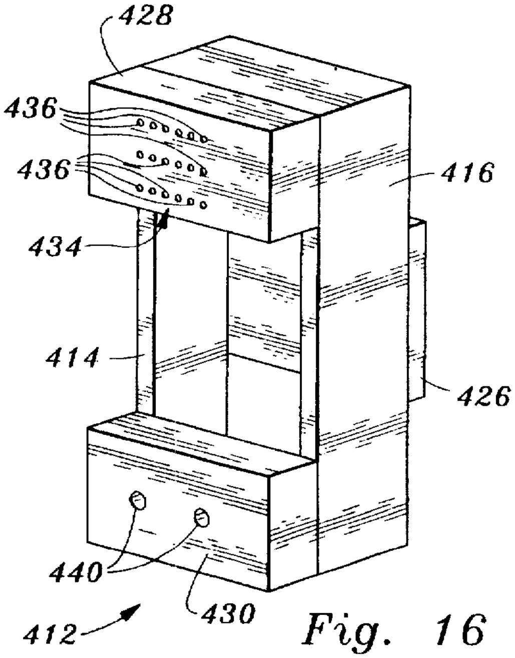
Figure 17:
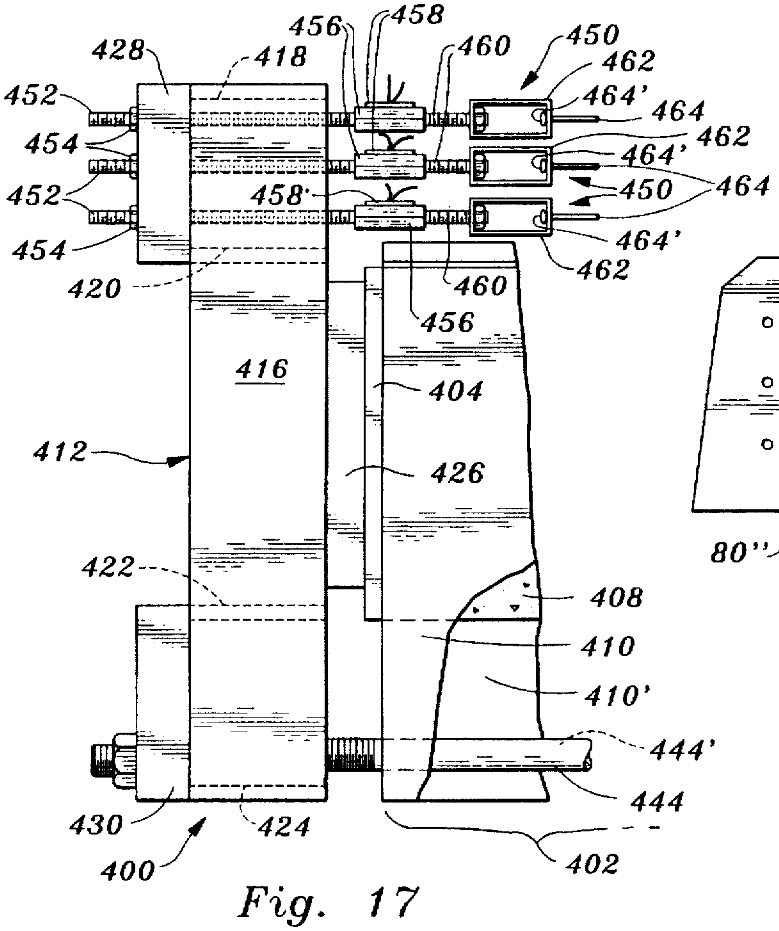

Referring now to FIGS. 15, 16, and 17, there is shown an apparatus 400 of a second preferred embodiment of the balanced compression type apparatus of the present invention.

Referring now to FIG. 15, there is shown in part the spine 402 of apparatus 400.

To the end of spine 402 which is shown in FIG. 15, a reinforcing plate 404 is affixed by means of bolts 406 which extend into cylindrical threaded inserts in the monolithic concrete body 408 of spine 402, the recessed heads of bolts 406 only being shown in FIG. 15.

It is to be noted that reinforcing plate 404 is plane faced, as compared with reinforcing plate 204 in the first preferred balanced compression embodiment shown in FIG. 8, which is provided with a transverse rib 208.

It is also to be noted that body 408 is provided with longitudinal flange-type legs 410, 410'.

Spine body 408 is a monolithic concrete member the length of which is determined by the number of tie molds which are to coact therewith, and a reinforcing plate 404' substantially identical to reinforcing plate 404 is affixed to the opposite end of spine body 408.

The term "monolithic" as used in the description of this second preferred embodiment of the balanced compression type of the apparatus of the present invention is to be understood to have the same denotation set out hereinabove in the description of the first preferred embodiment of the balanced compression type of apparatus of the present invention.

Comparing FIGS. 15 and 17, it will be seen that apparatus 400 further comprises a bridge member 412 which is of open frame construction as best seen in FIG. 16.

As may be seen by comparison of FIGS. 16 and 17, bridge member 412 is comprised of two vertical frame members 414, 416 which are joined together by four cross members 418, 420, 422, 424, all of which are permanently joined to vertical frame members 414, 416, as by arc welding.

A pressure plate 426 spans vertical members 414, 416 and is permanently joined thereto, as by arcwelding.

As best seen in FIG. 16, an array 434 of holes 436 passes through upper terminal plate 428, which is fixed to vertical members 414, 416.

Further, a pair of larger holes 440 passes through lower terminal plate 430, which is fixed to vertical members 414, 416.

It is to be understood that array 434 of holes 436 is an array similar to the reinforcing rod array of the railroad ties which are to be manufactured by means of apparatus 400.

In what follows the individual holes 436 and their associated reinforcing wires, etc., are designated in accordance with the same convention which is explained hereinabove in detail in connection with FIGS. 4 and 5.

Thus, in FIG. 16, the upper left-hand hole in terminal plate 428 is particularly designated by the designator 436A1, and the third hole from the left in the middle row of holes in terminal block 428 is designated by the designator 436C2.

As further seen in FIG. 17, a set of eighteen anchoring assemblies 450 are engaged with corresponding holes 436 in terminal plate 428 in the same manner in which anchoring assemblies 82 are engaged with terminal plate 76 in FIG. 4. Each anchoring assembly 450 is comprised of a threaded rod 452, a nut 454, an elongated hexagonal nut 456 to which is affixed a strain gauge 458, a second threaded rod 460, and a coupler 462 with which the end of a reinforcing wire 464 having a bulb 464' at its end is engaged. The parts of each anchoring assembly 450 are substantially identical to the corresponding parts of the anchoring assembly 82 shown in FIG. 4.

Figure 19:
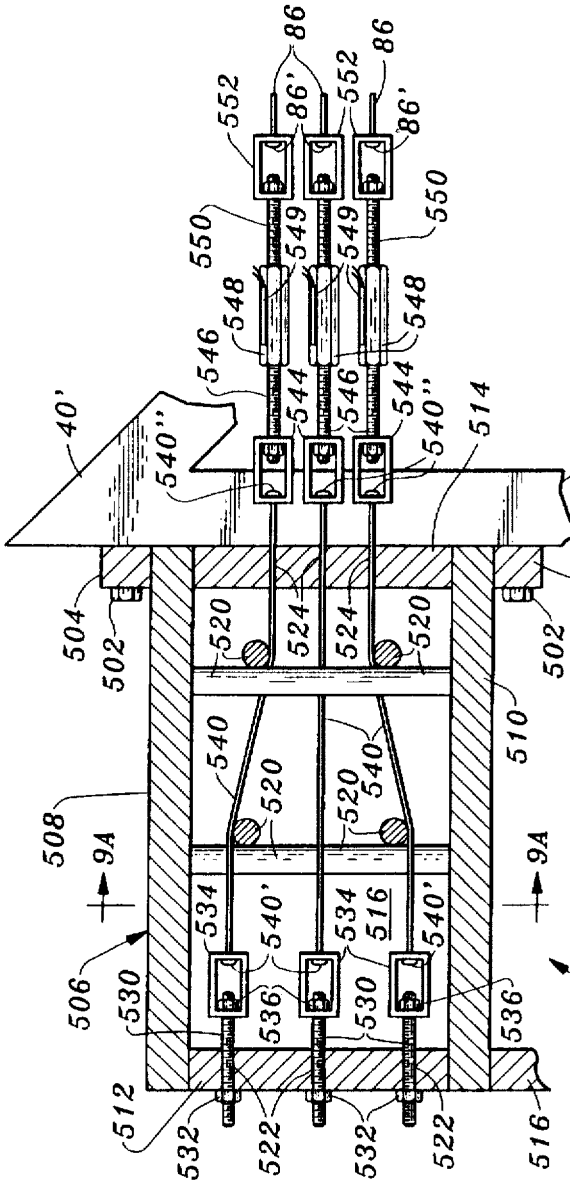
FIGS. 19 and 19A illustrate an array transforming device of the present invention.
Figure 19A:
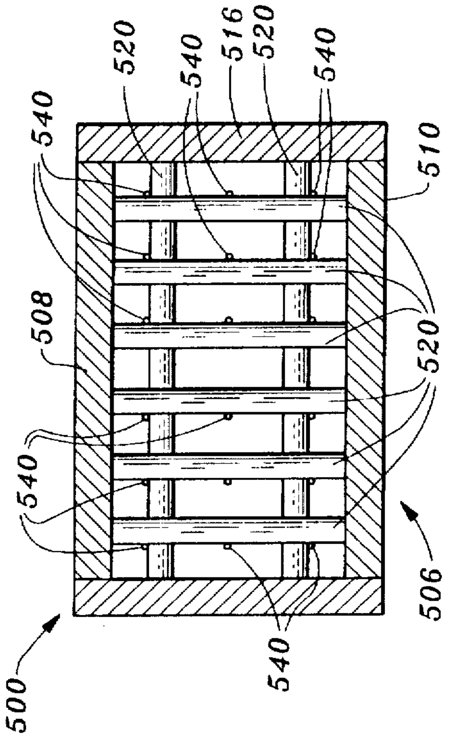

Referring now to FIGS. 19 and 19A, there is shown an array transformer device of the present invention which may be used when necessary or desirable to increase the separation between the reinforcing wire tension adjustment nuts of any particular apparatus of the present invention, such as the tension adjusting nuts 92 of the embodiment of the present invention shown in FIGS. 1, 2, 3, 4, 5, 6, 7 and 7A.

As best seen in FIG. 5, the tension adjusting nuts of a particular embodiment of the present invention may be located very close to each other, and thus may require the provision of specialized equipment to rotate the individual nuts in order to produce the specified tension in each reinforcing wire of a tie being produced by that apparatus.

It may be, then, that certain reinforcing wire arrays required by tie specifications issued by certain railroads or transit authorities may necessitate the use of an array transformer such as shown in FIGS. 19 and 19A.

Referring again to FIGS. 19 and 19A, there is shown an array transformer 500 of the present invention.

It is assumed that array transformer 500 is applied to the apparatus of the present invention shown in FIGS. 1, 2, etc., and that array transformer device 500 is thus substituted for terminal plate 76 in FIG. 2.

Thus, it will be seen that array transformer 500 is bolted to abutments 40' by means of bolts 502, which pass through suitable holes in the ears 504 of transformer device 500, and are then received in tapped holes in abutments 40'.

It is to be understood that transformer 500 is comprised of a closed housing 506 which consists of a set of steel plates 508, 510, 512, 514, 516, etc., which are bolted together to form housing 506. In addition to ears 504, housing 506 may be provided with one or more legs or struts 516 by means of which housing 506 is rigidly positioned with respect to the remainder of the apparatus of FIGS. 1, 2, etc.

As may be seen by comparison of FIGS. 19 and 19A, a plurality of rigid rods 520 are fixedly positioned within housing 506.

An array of holes 522 corresponding to the reinforcing wire array of the railroad tie to be produced, but with considerably larger interspacing than the reinforcing wires in the railroad tie to be produced, pass through plate 512 of housing 506.

A plurality of holes 524 arrayed in an array which is substantially identical to the specified array of reinforcing wires in the railroad tie to be produced pass through segmented wall plate 514 of housing 506.

A threaded rod 530 provided with a nut 532 passes through each of the holes 522 in wall plate 512 of housing 506.

A coupler 534 generally resembling coupler 101 shown in FIG. 4, but somewhat shorter, is secured to the inner end of each threaded rod 530 by means of an associated nut 536.

Each coupler 534 is attached to one end of a coupling cord 540 by means of a bulb 540' integrally molded or cemented to one end of coupling cord 540.

Each coupling cord 540 is fabricated from a cord of well known plastic material the tensile strength of which is several times the tensile strength of steel, such as Kevlar, which is used in critical applications such as that of automobile tire cords.

Plate 514 is segmented into elongate members which are coupled together by vertical rods in close-fitting holes (not shown), and holes 524 are defined between said elongate members, one half of each hole in one of said elongate horizontal members, whereby plate 514 can be disassembled for the replacement of one or more of coupling cords 540.

As seen in FIG. 19, then, the inner end of each coupling cord 540 passes through one of said holes 524, and is then affixed to a corresponding coupler 544 by means of its end bulb 540".

Each coupler 544 is joined to a threaded rod 546 in the manner in which the corresponding coupler 534 is joined to its associated threaded rod 530.

Each threaded rod 546 is joined to an elongated hexagonal nut 548 in the manner shown in FIG. 4, and described hereinabove in connection therewith.

In the manner described hereinabove in connection with FIG. 4, each elongated hexagonal nut 548 is provided with a strain gauge 549.

A threaded rod 550 is threaded into the end of each elongated hexagonal nut 548 remote from housing 506, and a coupler 552 is affixed to the opposite end of each threaded rod 550 by means of a nut which is welded to the yoke or frame of each coupler in the manner indicated in FIG. 4, and described in connection therewith.

The reinforcing wires 86 which are to be incorporated in the railroad ties to be produced are then fastened to their individual associated couplers 552 by means of their terminal bulbs 86', in the manner disclosed hereinabove in connection with FIG. 4.

As shown in FIG. 19A, rods 520 guide coupling cords 540 from the smaller array of holes 524 to the larger array of holes 522, without obstructing the passage of the bulbs 540' of cords 540 through housing 506.

Thus, it will be seen that array transformer 500 makes it possible to locate tensioning nuts 532 sufficiently far apart so that each nut is readily accessible to a socket-type torque wrench, and the complete plurality of tensioning nuts 32 may be serviced by a gang tensioner consisting of a plurality of rigidly mutually juxtaposed socket-type torque wrenches, or the like.

Figure 20A:
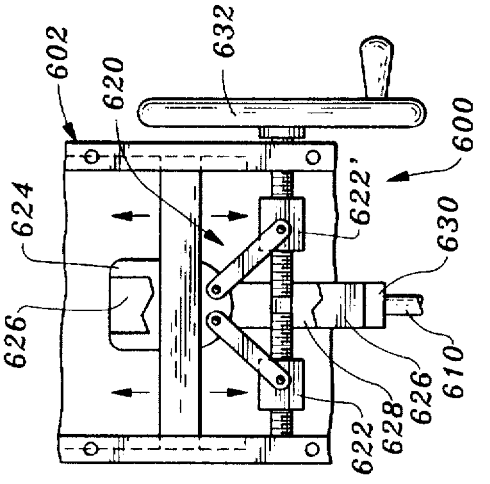
FIGS. 20 and 20A illustrate a reinforcing wire detensioning device of the present invention.
Figure 20:
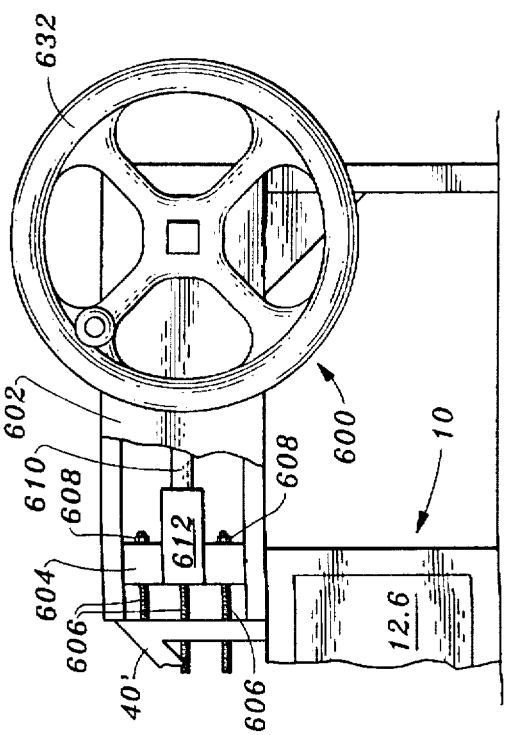

Referring now to FIGS. 20 and 20A, there is shown a detensioning device 600 which is a feature of the present invention.

While the reinforcing wire tension adjusting nuts of the apparatus of the present invention (e.g., nuts 92, FIG. 5) may be used to move together their reinforcing wire coupling devices at their respective ends of the apparatus of the present invention sufficiently to permit new reinforcing wires to be installed, it may in some apparatuses be desirable to provide means which avoid such extensive operating of the tension adjusting nuts in order to avoid wear of the tensioning nuts and their associated threaded rods. Detensioning device 600 is such a means.

As best seen in FIG. 20, detensioning device 600 is assumed to be adapted to apparatus 10 of the present invention, in lieu of the tensioning plate 40' located at the second or uninstrumented end thereof.

As seen in FIG. 20, detensioning device 600 is comprised of a closed housing 602 one end of which is disposed upon module 12.6, and is affixed to the two abutments 40' located at that end of apparatus 10 by means of suitable bolts and tapped holes (not shown).

A movable terminal plate 604 is slidably mounted in housing 602, and the ends of a plurality of threaded rods 606 are maintained in a suitable array of holes passing through movable terminal plate 604 by means of associated nuts 608.

As will now be evident to those having ordinary skill in the art, informed by the present disclosure, each threaded rod 606 is provided with a coupler of the kind shown in FIG. 4, and an associated reinforcing wire is affixed to the opposite end of each such coupler in the manner indicated in FIG. 4.

A rigid horizontal positioning rod 610 (FIG. 20) is coupled to terminal plate 604 by means of a yoke 612 (FIG. 20) which permits access to all of the nuts 608.

As seen in FIG. 20A, a differential screw and toggle mechanism 620 of well known type, often employed in older toggle presses, is mounted in housing 602.

A typical mechanism of this type is shown and described in the book "Mechanisms, Linkages, and Mechanical Controls", edited by Nicholas P. Chironis, and published by the McGraw-Hill Book Company, Inc., in 1965, at page 155.

As there explained, this mechanism provides increasing mechanical advantage as nuts 622, 622' approach each other.

As also seen in FIG. 20A, the moving output block 624 of mechanism 620 is rigidly coupled to rod 610 by means of a yoke comprised of upper and lower members 626, 628, which are coupled to each other and to rod 610 by a vertical crosspiece 630.

Thus, it will be evident to those having ordinary skill in the art, informed by the present disclosure, that by rotating handwheel 632 an operator of the apparatus may move tensioning plate 604 (FIG. 20) in either direction, and thus may either move the reinforcing wire couplers affixed to threaded rods 606 to the left as shown in FIG. 20, thus permitting the easy insertion of the ends of reinforcing wires into the couplers associated with threaded rods 606, or, by rotating hand wheel 532 in the opposite direction, may forcefully draw terminal plate 604 to the right as shown in FIG. 20, thereby producing sufficient tension in all of the reinforcing wires so that only small changes need be made in the tensions of the individual reinforcing wires by means of the tensioning nuts located at the opposite end of apparatus 10.

Figure 21:
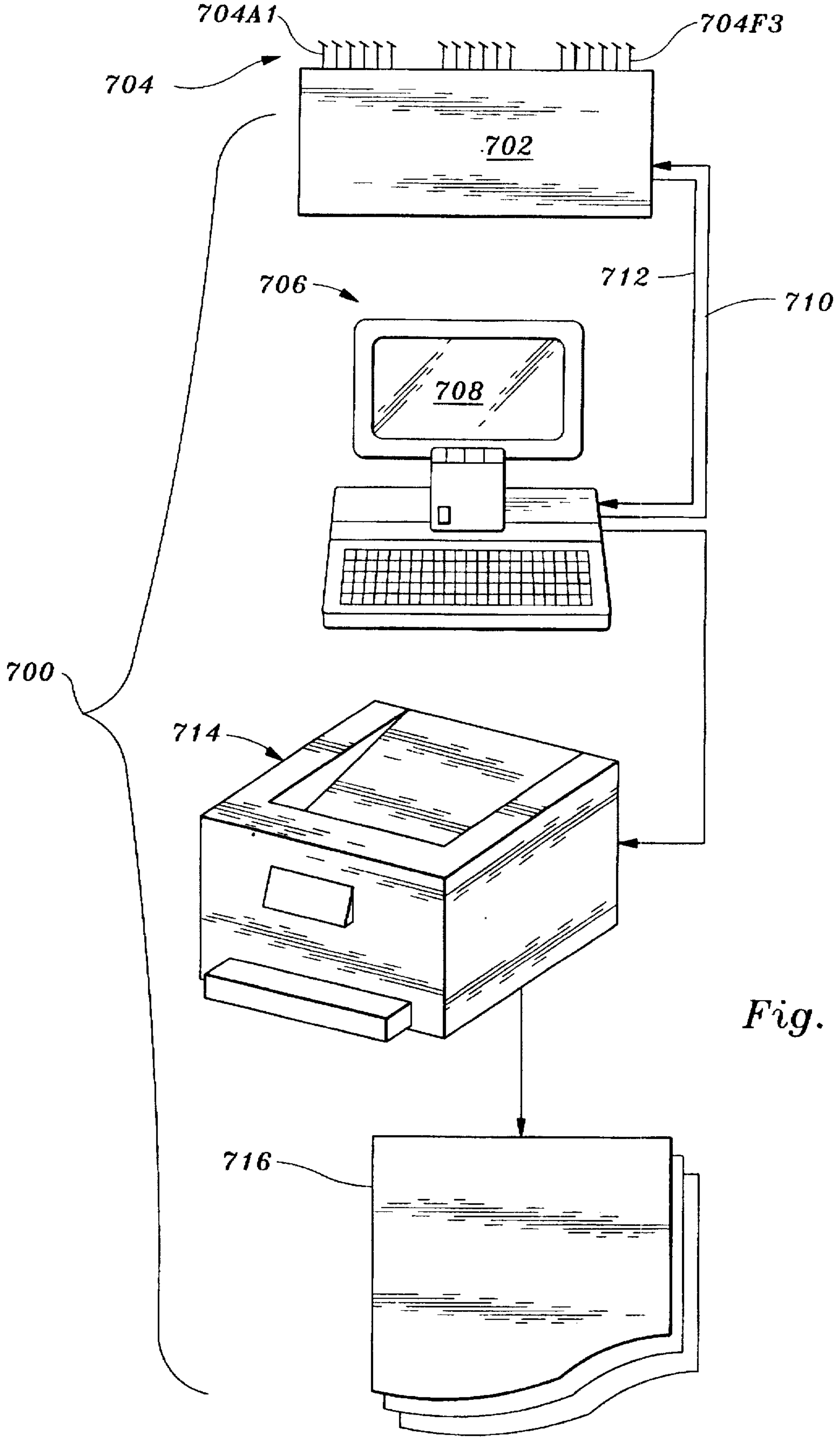
FIG. 21 is a schematic representation of the electronic data conversion and printout means of certain embodiments of the present invention.

Referring now to FIG. 21, there is shown the reinforcing wire tension reading and recording apparatus 700 which is a principal feature of the present invention.

Reading and recording apparatus 700 is comprised of a converter unit 702 which is provided with a number of input jacks 704 equal to the number of strain gauges employed in a particular corresponding apparatus of the present invention.

Each cable 704A1, 704A2 . . . 704F2, 704F3, is plug-connected to an associated input jack 704 of converter 702, and contains four electrically independent conductors.

Thus, as will be evident to those having ordinary skill in the art, each input jack 704 of converter 702 is connected to the four terminals of an associated bridge-type strain gauge. Converter 702 applies a voltage to two terminals of each bridge-type strain gauge via two conductors of its associated cable, and receives a signal proportional to the momentary tensile force experienced by that strain gauge via the other two conductors thereof.

It is to be understood, however, that the present invention does not exclusively contemplate the use of bridge-type strain gauges, and that thus other strain gauges of well known type may be used, and coupled to a suitable associated converter 702.

It is further to be noted that the present invention is not limited to the employment of the particular type of strain gauge shown herein, e.g., in FIG. 4, but rather, in different embodiments, may utilize any available type of commercial strain gauge suited to the purpose.

As also indicated in FIG. 21, converter 702 is linked to a computer 706, and cooperates with computer 706 to display on the display screen 708 of computer 706 a tabulation of the currently existing tension in each reinforcing wire held in tension between the two terminal plates of the associated railroad tie manufacturing apparatus of the present invention.

For this purpose, computer 706 supplies to converter 702, on line 710, a clock signal which is used in coordinating the action of converter 702 with the operation of computer 706.

Cable 712 serves to transfer from converter 702 to computer 706 a series of signals representing the tensile forces in the respective reinforcing wires tensioned between the terminal plates of the associated apparatus of the present invention.

In accordance with a principal feature of the present invention, a printer 714 which is driven by computer 706 serves to provide, for each set of ties produced by the associated apparatus of the invention, a printed certificate 716 tabulating the tension in each reinforcing wire at some time during the curing of the concrete of the resulting railroad tie.

It is also a feature of the present invention to so program computer 706 that certificate 716 tabulates the maximum and minimum tension experienced by each reinforcing wire at any time during the curing of a particular set of railroad ties.

By way of example, each Kevlar coupling cord 540 shown in FIG. 19 may be provided with a sylphon or bellows, the closed end of which is cemented or otherwise affixed to the cord and the open end of which is adapted to be airtightly secured to a single plate 514, the holes 524 being of sufficient diameter to freely admit the bulbs 540' of the coupling cords 540, whereby to prevent the incursion of dust and moisture into housing 506.

By way of a further example, a vertical partition may be provided in the detensioning apparatus 600 of the invention shown in FIG. 20, which partition contains a packing gland through which rod 610 passes, whereby to prevent the incursion of dust and moisture into the chamber containing differential screw and toggle mechanism 620.

Further, it is to be understood that the mold raising and lowering mechanism, the array transformer mechanism and the detensioning mechanism of the invention may, or all or any of them, may be used in an apparatus embodying any of the spine constructions of the present invention shown and described herein.

It will thus be seen that the objects set forth above, among those made apparent from the preceding description, are efficiently attained, and since certain changes may be made in the above constructions and the methods carried out thereby without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention hereindescribed, and all statements of the scope of the invention which, as a matter of language, might be said to fall therebetween.

What is claimed is:

1. Apparatus for use in the manufacturing of reinforced concrete railroad ties, comprising:

elongated spine means;

first and second bridge means respectively located adjacent one end of said spine means and adjacent the other end of said spine means, both of said bridge means extending transversely of said spine means;

a first plurality of tie reinforcing member anchoring means;

a second plurality of tie reinforcing member anchoring means;

first collocating means for maintaining said first plurality of tie reinforcing member anchoring means in a predetermined collocation on said first bridge means;

second collocating means for maintaining said second plurality of tie reinforcing member anchoring means in a predetermined collocation on said second bridge means;

tensioning means for individually tensioning said tie reinforcing members;

bridge interconnecting means for interconnecting a portion of said first bridge means remote from said first collocating means and a portion of said second bridge means remote from said second collocating means, whereby to maintain the distance between said collocating means against the stresses produced in said apparatus by the tensioning of a plurality of said reinforcing members between corresponding ones of said anchoring means.

2. Apparatus as claimed in claim 1, further comprising a plurality of tie molds none of which is attached to said spine means.

3. Apparatus as claimed in claim 2, said apparatus being capable of withstanding the stresses produced therein by the tensioning of a plurality of said reinforcing members between corresponding ones of said anchoring means without reinforcement of said apparatus by other structural means.

4. Apparatus as claimed in claim 2 in which tension magnitude signal producing means are coupled between each one of said reinforcing members and an associated one of said anchoring means.

5. Apparatus as claimed in claim 2 in which said spine means is comprised of a plurality of separately fabricated modules which are joined together in end-to-end relationship.

* * * * *